United States Patent [19]

Maekawa et al.

[11] Patent Number: 5,379,361
[45] Date of Patent: Jan. 3, 1995

[54] OPTICAL FIBER CONNECTOR INCLUDING L-SHAPED POSITIONING STANDARD SURFACES AND METHOD OF MANUFACTURING THE SAME

[75] Inventors: Koichiro Maekawa, Ichinomiya; Takashi Ota, Kasugai; Masashi Fukuyama, Nagoya; Shinji Nagasawa, Mito, all of Japan

[73] Assignees: NGK Insulators, Ltd.; Nippon Telegraph & Telephone Public Corporation, both of Japan

[21] Appl. No.: 36,871

[22] Filed: Mar. 25, 1993

[30] Foreign Application Priority Data

Mar. 30, 1992 [JP] Japan .................. 4-74391

[51] Int. Cl.6 .................. G02B 6/38; G02B 6/40
[52] U.S. Cl. .................. 385/65; 385/59; 385/71; 385/83
[58] Field of Search .................. 385/59, 71, 114, 65, 385/83

[56] References Cited

U.S. PATENT DOCUMENTS

| | | | |
|---|---|---|---|
| 4,046,454 | 9/1977 | Pugh, III .................. | 385/59 |
| 4,762,387 | 8/1988 | Batdorf et al. .................. | 385/71 |
| 4,836,638 | 6/1989 | Finzel .................. | 385/59 |
| 4,865,413 | 9/1989 | Hübner et al. .................. | 385/71 |
| 4,943,136 | 7/1990 | Popoff .................. | 385/65 |
| 4,973,127 | 11/1990 | Cannon, Jr. et al. .................. | 385/65 X |
| 5,082,346 | 1/1992 | Myers .................. | 385/65 X |

FOREIGN PATENT DOCUMENTS

| | | | |
|---|---|---|---|
| 0241724 | 10/1987 | European Pat. Off. . | |
| 0045051 | 3/1980 | Japan .................. | 385/59 |
| 0030112 | 3/1981 | Japan .................. | 385/59 |
| 63-56619 | 3/1988 | Japan .................. | 385/65 |
| 0276104 | 11/1989 | Japan .................. | 385/59 |
| 4-338703 | 11/1992 | Japan . | |

OTHER PUBLICATIONS

"Ultra High Density Single-Mode 50-Fiber Connector", Satake et al., the meeting on the faculty of semiconductors and materials of the Institute of Electronics, Information and Communication Engineers, (1987), pp. 2-248.

"Ultra High Density 50-Fiber Connector", Satake et al., the 70th Anniversary Meeting of the Institute of Electronics, Information and Communication Engineers (1987), Sep. 1982.

"Ultra High Density 50-Fiber Connector", Sakate et al., *The Transactions of the IEICE*, vol. E 70, No. 7, Jul. 1987.

Patent Abstracts of Japan, vol. 5, No. 185 (P-91) Nov. 25, 1981 & JP-A-56, 113,114 (Fujitsu) Sep. 4, 1981, Kobayashi.

Patent Abstracts of Japan, vol. 5, No. 191 (P-82) Dec. 5, 1981 & JP-A-56, 114,909 (Nippon Denshin Denwa Kosha) Sep. 9, 1981, Fujii.

*Primary Examiner*—Rodney B. Bovernick
*Assistant Examiner*—Hemang Sanghavi
*Attorney, Agent, or Firm*—Parkhurst, Wendel & Rossi

[57] ABSTRACT

An optical fiber connector for splicing a plurality of optical fibers integrally, including V-groove substrates each comprising V-grooves for setting optical fibers therein. Further, positioning standard surfaces arranged in parallel with a V-groove forming direction are formed in the substrates to enable stacking of the substrates on the basis of the positioning standard surfaces.

10 Claims, 3 Drawing Sheets

FIG_1
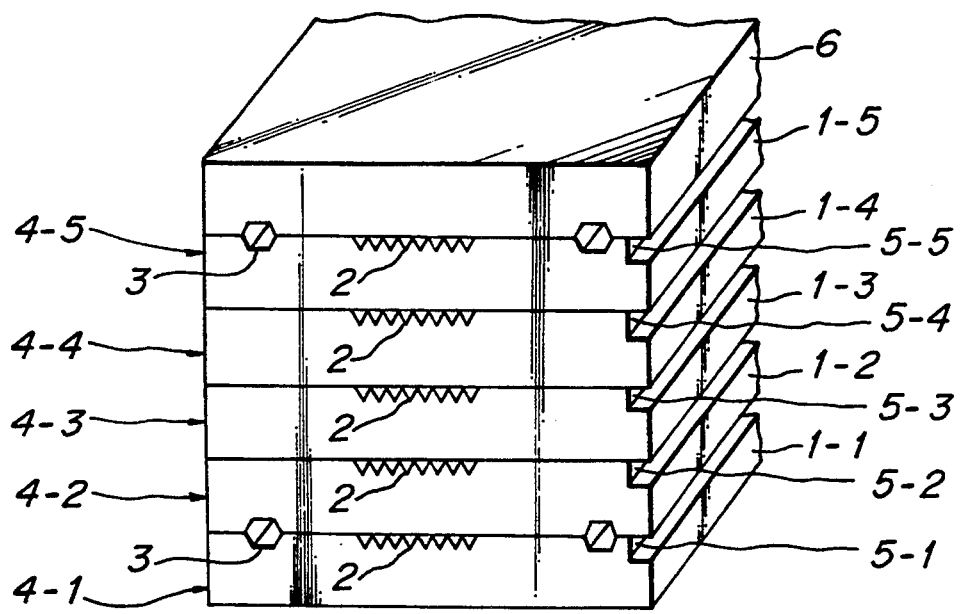
FIG_2
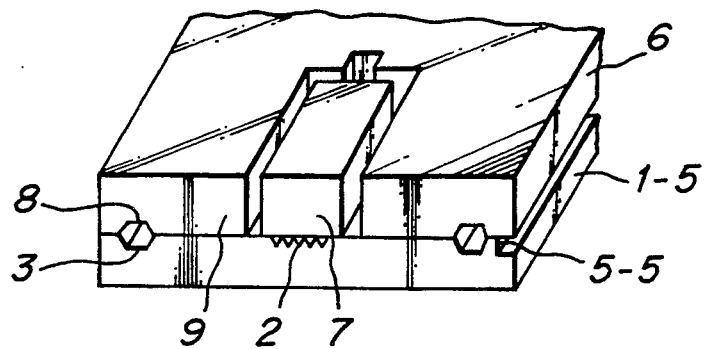

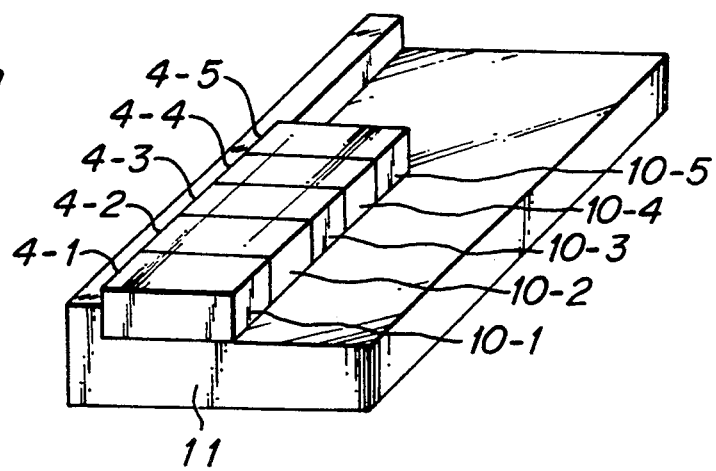
FIG._3a
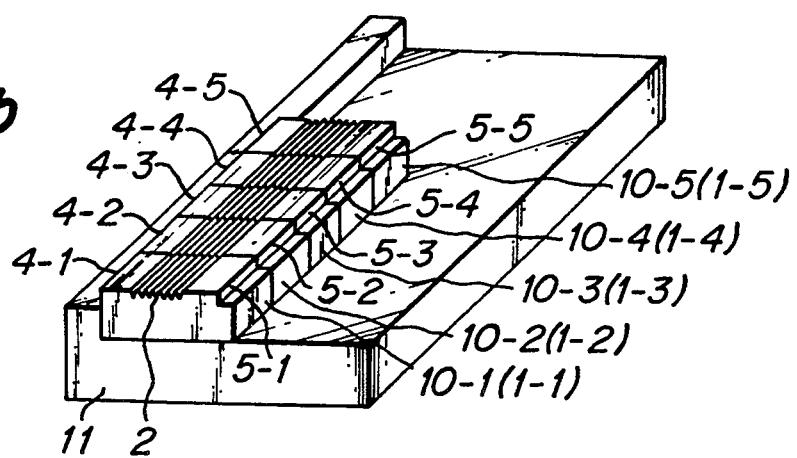
FIG._3b
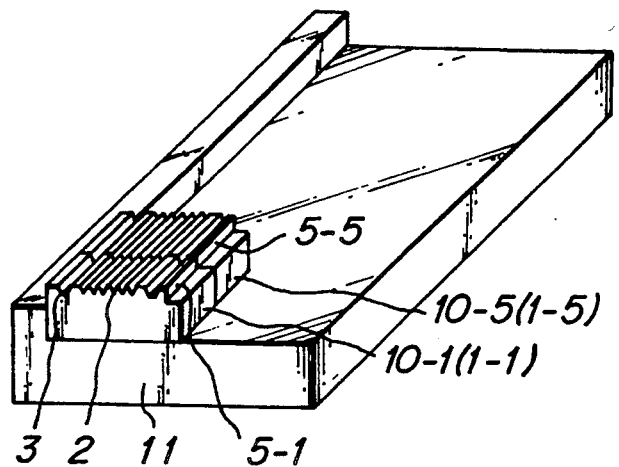
FIG._3c

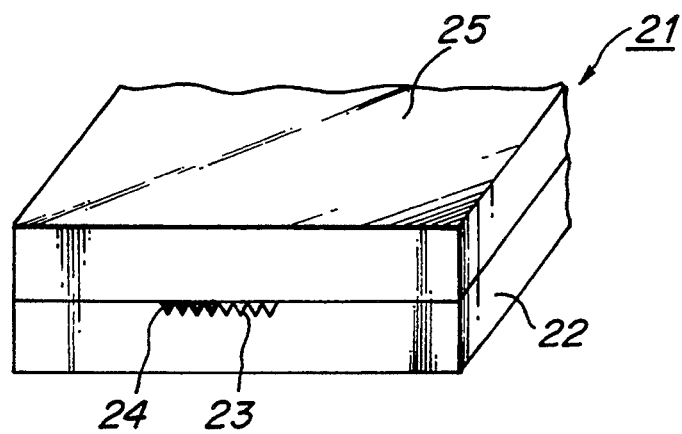
FIG_4
PRIOR ART
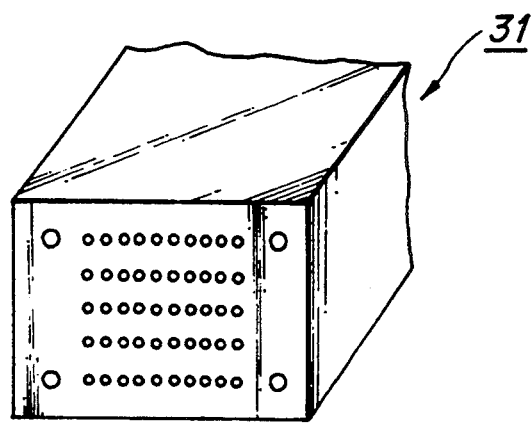
FIG_5
PRIOR ART

OPTICAL FIBER CONNECTOR INCLUDING L-SHAPED POSITIONING STANDARD SURFACES AND METHOD OF MANUFACTURING THE SAME

BACKGROUND OF THE INVENTION

1. Field of the Invention

The present invention relates to an optical fiber connector for splicing a plurality of optical fibers integrally, and also relates to a method of manufacturing the optical fiber connector mentioned above.

2. Description of the Related Art

A known optical fiber connector for splicing a plurality of optical fibers integrally, is shown in FIG. 4, including an optical fiber connector 21 comprising a V-groove substrate 22 having a number of V-grooves 23 on which a number of optical fibers 24 are set respectively, and a cap plate 25 for pressing the optical fibers 24 from an upper side. In the optical fiber connectors 21 mentioned above, if the optical fiber connectors 21 each having the construction shown in FIG. 4 are stacked with each other so as to increase the number of the optical fibers to be spliced, there is a drawback such that the optical fibers 24 arranged above and below optical fiber connectors 21 are not positioned accurately. Moreover, there are drawbacks such that the optical fiber connector 21 becomes large, the number of members to be used for the optical fiber connector 21 becomes larger, and a working surface is not used effectively.

Further, one example of an optical fiber connector for splicing more number of the optical fibers integrally is shown as "Ultra high density single-mode 50-fiber connectors" in DENSI-TSUHIN-JYŌHŌ-GAKKAI, 70th commemorative meeting, summary No 1999, page 9-82, 1987. FIG. 5 is a schematic view showing one embodiment of the optical fiber connector mentioned above. As shown in FIG. 5, an optical fiber connector 31 for splicing 50 optical fibers integrally is manufactured by stacking five optical fiber tapes each having ten optical fibers 32 in line in an accurate manner through resin members by means of a resin injection method and so on.

In the optical fiber connector 31, as is the same as the optical fiber connector 21, a positional relation between ten optical fibers 32 arranged in line is accurate since the optical fiber tape is used, but the optical fibers 32 arranged above and below optical fiber tapes are not positioned accurately. As a result, when a plurality of optical fibers are spliced by using the optical fiber connectors mentioned above, the optical fibers are not spliced accurately and a light transmitting loss becomes larger, so that signals transmitting through the optical fibers are reduced in the optical fiber connectors.

SUMMARY OF THE INVENTION

It is an object of the present invention to eliminate the drawbacks mentioned above, and to provide an optical fiber connector and a method of manufacturing the optical fiber connector mentioned above, which can splice a plurality of optical fibers integrally in an accurate and compact manner.

According to the invention, an optical fiber connector for splicing a plurality of optical fibers integrally comprises a construction such that substrates having V-grooves, on which optical fibers are set, are stacked with each other, and the optical fibers set in the V-grooves of a lower V-groove substrate is pressed by a bottom outer surface of an upper V-groove substrate.

According to the invention, a method of manufacturing an optical fiber connector for splicing a plurality of optical fibers integrally comprises the steps of, forming V-grooves on ceramic substrates, forming positioning standard surfaces arranged in parallel with a V-groove forming direction to obtain V-groove substrates, and stacking said V-groove substrates having V-grooves, on which optical fibers are set, on the basis of said positioning standard surfaces.

In the construction mentioned above, it is not necessary to use all the cap members except for an uppermost cap member in case of stacking the V-groove substrate. Therefore, the optical fiber connector according to the invention requires fewer members and is thus compact in size. Moreover, in a preferred embodiment, V-grooves of the V-groove substrates for setting a plurality of optical fibers, positioning standard surfaces utilizing in case of stacking the V-groove substrates, and guide-grooves for setting guide pins are formed by using the same working standard surfaces. Moreover, also in the preferred embodiment, the optical fiber connector for splicing a plurality of optical fibers is manufactured by stacking the V-groove substrates by using the same positioning standard surfaces. Therefore, the optical fibers arranged upper and lower V-groove substrates are positioned accurately as well as the optical fibers arranged in line.

BRIEF DESCRIPTION OF THE DRAWINGS

FIG. 1 is a schematic view showing one embodiment of an optical fiber connector according to the invention;

FIG. 2 is a schematic view illustrating an another embodiment of an uppermost V-groove substrate;

FIGS. 3a to 3c are schematic views depicting respective steps of a method of manufacturing the optical fiber connector according to the invention;

FIG. 4 is a schematic view showing one embodiment of a known V-groove substrate; and FIG. 5 is a schematic view illustrating one embodiment of a known optical fiber connector.

DESCRIPTION OF THE PREFERRED EMBODIMENTS

FIG. 1 is a perspective view showing one embodiment of an optical fiber connector for splicing a plurality of optical fibers according to the invention. In this embodiment, each V-groove substrate 1-1~1-5 holds eight optical fibers in line respectively. That is to say, eight V-grooves 2 for setting optical fibers are formed equidistantly and at the same positions on respective V-groove substrates 1-1~1-5. Moreover, two grooves 3 for setting guide pins are formed at the same positions on the lowermost V-groove substrate 1—1 and the uppermost V-groove substrate 1-5. When stacking the V-groove substrates 1-1~1-5, bottom outer surfaces of the V-groove substrate 1-2~1-5 press the optical fibers in the V-grooves 2.

Further, working standard surfaces 4-1~4-5 are arranged on one side surface of respective V-groove substrates 1-1~1-5, and positioning standard surfaces 5-1~5-5, each having L-shape cross section and defined by a vertical surface of the L-shape cross section, are arranged on the other side surfaces of respective V-groove substrates 1-1~1-5. Moreover, a cap plate 6 is arranged on the uppermost V-groove substrate 1-5 so as to press the optical fibers in the V-grooves 2 of the uppermost V-groove substrate 1-5. Connections after stacking operations between respective V-groove substrates 1-1~1-5 and between the V-groove substrate 1-5 and the cap plate 6 are performed by using adhesion agents such as resin. It should be noted that the L-shape positioning standard surfaces 5-1~5-5 may be cut out to obtain a plain side surface.

FIG. 2 is a schematic view showing another embodiment of the uppermost V-groove substrate utilizing the cap plate 6. In the embodiment shown in FIG. 2, only the uppermost V-groove substrate 1-5 and the cap plate 6 are shown. As shown in FIG. 2, the cap plate 6 is formed by an optical fiber press portion 7 arranged corresponding to the V-grooves 2 and a guide pin press portion 9 separately formed with the optical fiber press portion 7 and having grooves arranged corresponding to the grooves 3. Therefore, since the optical fibers and the guide pins are separately fixed by using the optical fiber press portion 7 and the guide pin press portion 9, it is possible to realize a more stable optical fiber connector than the connector shown in FIG. 1.

FIGS. 3a-3c are schematic views showing respective steps of a method of manufacturing the optical fiber connector according to the invention. At first, as shown in FIG. 3a, five ceramic substrates 10-1~10-5 each having the same dimension are set in line to a right-angled support member 11 on the basis of the working standard surfaces 4-1~4-5 arranged parallel to a V-groove direction. Then, as shown in FIG. 3b, eight V-grooves 2 are formed on surfaces of respective ceramic substrates 10-1~10-5, and the positioning standard surfaces 5-1~5-5 each having an L-shape cross section are formed on the other side surfaces with respect to the working standard surfaces 4-1~4-5, by using a grinding machine not shown to obtain the V-groove substrates 1-1~1-5.

Further, as shown in FIG. 3c, only the lowermost V-groove substrate 1—1 and the uppermost V-groove substrate 1-5 are set to the right-angled support member 11, and then the grooves 3 for holding the guide pins are formed on the V-groove substrates 1-1 and 1-5. Then, the optical fibers are set in the V-grooves 2 of respective V-groove substrates 1-1~1-5, the V-groove substrates 1-1,~1-5 are stacked by using a comb-shape support member (not shown) on the basis of the positioning standard surfaces 5-1~5-5. Finally, the cap plate 6 is arranged on the uppermost V-groove substrate 1-5 to obtain the optical fiber connector according to the invention. In this case, even if the dimensions of the ceramic substrates 10-1~10-5 are a little different with respect to each other, the positional relations between the V-grooves 2 and the positioning standard surfaces 5-1~5-5 are always accurate, since they are worked at the same time by using the right-angled support member 11. Therefore, the optical fibers fixed in the V-grooves 2 of the V-groove substrates 1-1~1-5 can be arranged in an accurate manner, if the V-groove substrates 1-1~1-5 are stacked on the basis of the positioning standard surfaces 5-1~1-5.

Further, in the present invention, the reason for using the positioning standard surfaces 5-1~5-5 is as follows. If the V-groove substrates are stacked on the basis of the working standard surfaces 4-1~4-5, the positional relations between the V-grooves 2 and the working standard surfaces 4-1~4-5 may not be accurate, due to imperfections in the right-angled support member 11, a positional relation between the right-angled support member 11 and the grinding machine, and existence of dust between the ceramic substrates 10-1~10-5 and the right angled support member 11.

The present invention is not limited to the embodiments mentioned above, but various modifications can be possible. For example, in the preferred embodiments mentioned above, the cap member 6 comprising the optical fiber press portion 7 and the guide pin press portion 9 are arranged only on the uppermost V-groove substrate 1-5. However it is possible to form the same construction on the bottom outer surface of the V-groove substrate 1-2 which functions to press the lowermost V-groove substrate 1-1 so as to fasten the optical fibers and the guide pins in an accurate manner. Moreover, in the embodiment mentioned above, the positioning standard surfaces have the L-shape cross section, but it is possible to use cut-out surfaces as the positioning standard surfaces.

As clearly understood from the above, according to the invention, since it is not necessary to use a plurality of cap members, the optical fiber connector according to the invention utilizes fewer members and is compact. Moreover, in the preferred embodiments, since the V-grooves, the positioning standard surfaces and the guide-grooves are formed by using the same working standard surfaces, and since the optical fiber connector is manufactured by stacking the V-groove substrates by using the same positioning standard surfaces, the optical fibers arranged above and below V-groove substrates are positioned accurately, and the optical fibers arranged in line.

What is claimed is:

1. An optical fiber connector for receiving optical fibers in V-grooves, comprising:
a plurality of substrates including a first and a second substrate, said first and second substrates each including top and bottom opposite major surfaces, a plurality of V-grooves extending parallel to each other and along said top surface, and positioning standard surfaces in side surfaces of said substrates formed by positioning the substrates in a right-angled support member and grinding the substrates to form said L-shaped positioning standard surface, said L-shaped positioning standard surface extending parallel to respective V-grooves, such that a distance between said L-shaped positioning standard surface and said respective V-grooves of each substrate is equal, wherein said second substrate is stacked on said first substrate such that the bottom surface of said second substrate contacts the top surface of said first substrate along a horizontal plane, said bottom surface of said second substrate having a portion thereof which rests on and is superposed over said V-grooves of the first substrate, said portion being planar and being co-planar with said horizontal plane.

2. The device of claim 1, further comprising guide-grooves formed in the top surface of said first substrate and the bottom surface of said second substrate, said guide-grooves extending parallel to said V-grooves for receiving guide pins.

3. The device of claim 2, further comprising a cap member disposed on said second substrate.

4. The device of claim 1, wherein the positioning standard surfaces extend through the entire thickness of each of the first and second substrates.

5. The device of claim 1, wherein said first and second substrates are ceramic.

6. The device of claim 1, wherein each of said plurality of substrates has the same width, said width being perpendicular to said V-grooves.

7. A method for manufacturing an optical fiber connector having V-grooves for receiving optical fibers, comprising the steps of:
   aligning a plurality of ceramic substrates along a first direction, each ceramic substrate having top and bottom opposite major surfaces;
   forming V-grooves parallel to said first direction in the top surfaces of each of the ceramic substrates;
   forming a continuous positioning standard surface in said ceramic substrates, said positioning standard surface extending parallel to the V-grooves such that a distance between the V-grooves and the positioning standard surface of each of the ceramic substrates is equal, said continuous positioning standard surface being formed after said plurality of ceramic substrates are aligned along said first direction; and
   stacking the ceramic substrates on each other and aligning the V-grooves of each of the ceramic substrates with each other along a stacking direction by aligning the positioning standard surfaces along the stacking direction.

8. The method of claim 7, further comprising the step of forming guide-grooves in the top surface of at least two of the ceramic substrates.

9. The method of claim 7, wherein said positioning standard surface is exposed at a side surface of each of the ceramic substrates.

10. The method of claim 9, wherein said positioning standard surface is formed in a side surface of each of the ceramic substrates.

* * * * *